United States Patent
Seki et al.

(10) Patent No.: US 9,574,709 B2
(45) Date of Patent: Feb. 21, 2017

(54) COOLED-HYDROGEN SUPPLY STATION AND HYDROGEN COOLING APPARATUS

(71) Applicant: Shinwa Controls Co., Ltd., Kawasaki-Shi (JP)

(72) Inventors: Atsushi Seki, Kawasaki (JP); Tsuyoshi Higuchi, Kawasaki (JP)

(73) Assignee: Shinwa Controls Co., Ltd., Kawasaki-Shi (JP)

( * ) Notice: Subject to any disclaimer, the term of this patent is extended or adjusted under 35 U.S.C. 154(b) by 13 days.

(21) Appl. No.: 14/402,822

(22) PCT Filed: Jul. 10, 2014

(86) PCT No.: PCT/JP2014/068475
§ 371 (c)(1),
(2) Date: Nov. 21, 2014

(87) PCT Pub. No.: WO2015/098158
PCT Pub. Date: Jul. 2, 2015

(65) Prior Publication Data
US 2015/0345705 A1 Dec. 3, 2015

(30) Foreign Application Priority Data
Dec. 27, 2013 (JP) .................... 2013-273096

(51) Int. Cl.
*F17C 5/06* (2006.01)
*F25B 41/04* (2006.01)
(Continued)

(52) U.S. Cl.
CPC ............. *F17C 5/06* (2013.01); *B60L 11/1892* (2013.01); *F25B 25/005* (2013.01); *F25B 41/04* (2013.01);
(Continued)

(58) Field of Classification Search
CPC ............... F17C 5/06; F17C 2270/0168; F17C 2270/0184; F17C 2223/0123; F17C 2223/036; F17C 2225/0123; F17C 2225/036; F17C 2227/0348; F17C 2227/0355; F17C 2227/0388; F17C 2265/065; F17C 2265/061; F17C 2221/012; F17C 2250/0439; F17C 2260/025; Y02E 60/321; Y02T 90/34; F25B 41/04; F25B 25/005; F25D 17/02; H01M 8/04208; B60L 11/1892; B60L 2240/36
See application file for complete search history.

(56) References Cited

U.S. PATENT DOCUMENTS 2,748,179 A * 5/1956 Retailliau ................ C10G 9/38
208/3
2,765,634 A * 10/1956 Whitlow ................. F25B 43/00
62/108
(Continued)

FOREIGN PATENT DOCUMENTS

JP 54-152244 A1 11/1979
JP 04-151477 A1 5/1992
(Continued)

OTHER PUBLICATIONS

Japanese Office Action (Application No. 2013-273096) dated May 7, 2014 (with English translation).
(Continued)

*Primary Examiner* — Ljiljana Ciric
(74) *Attorney, Agent, or Firm* — Burr & Brown, PLLC

(57) ABSTRACT

A cooled-hydrogen supply station includes: a first coolant passage through which a first coolant circulates; a water-cooled refrigerator unit disposed on a part of the first coolant passage to cool the first coolant; a second coolant passage through which a second coolant flows; a first heat exchanger
(Continued)

for cooling the second coolant by the first coolant, between another part of the first coolant passage and a part of the second coolant passage; a hydrogen storage unit; a hydrogen passage for transporting hydrogen stored in the hydrogen storage unit; and a second heat exchanger for cooling the hydrogen by the second coolant, between another part of the second coolant passage and a part of the hydrogen passage. The hydrogen is cooled down to a temperature of −43° C. to −20° C. by the second heat exchanger, and a hydrogen cooling power for cooling hydrogen to −40° C. is between 13.5 kW and 16.5 kW.

6 Claims, 2 Drawing Sheets

(51) Int. Cl.
 F25D 17/02 (2006.01)
 F25B 25/00 (2006.01)
 B60L 11/18 (2006.01)
 H01M 8/04 (2016.01)
(52) U.S. Cl.
 CPC ............ *F25D 17/02* (2013.01); *B60L 2240/36* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0341* (2013.01); *F17C 2227/0348* (2013.01); *F17C 2227/0355* (2013.01); *F17C 2227/0388* (2013.01); *F17C 2250/0439* (2013.01); *F17C 2260/025* (2013.01); *F17C 2265/061* (2013.01); *F17C 2265/065* (2013.01); *F17C 2270/0168* (2013.01); *F17C 2270/0184* (2013.01); *H01M 8/04208* (2013.01); *Y02E 60/321* (2013.01); *Y02T 90/34* (2013.01)

(56) References Cited

U.S. PATENT DOCUMENTS

| | | | | | |
|---|---|---|---|---|---|
| 2,939,763 | A | * | 6/1960 | Cooper | C01C 1/24 210/710 |
| 3,133,016 | A | * | 5/1964 | Hardison | C02F 1/725 210/763 |
| 3,149,166 | A | * | 9/1964 | Poehler | C07C 45/002 568/361 |
| 3,199,955 | A | * | 8/1965 | West | C01B 17/0478 423/570 |
| 3,231,492 | A | * | 1/1966 | Hardison | B01D 15/1828 208/310 R |
| 3,285,028 | A | * | 11/1966 | Newton | F25B 9/004 62/117 |
| 5,711,165 | A | * | 1/1998 | Iizuka | F25B 31/002 252/68 |
| 5,977,427 | A | * | 11/1999 | Tamata | A62D 3/20 423/240 R |
| 5,993,875 | A | | 11/1999 | Iljørnevik et al. | |
| 6,652,817 | B1 | * | 11/2003 | Tamata | B01D 53/8662 422/205 |

FOREIGN PATENT DOCUMENTS

| | | |
|---|---|---|
| JP | 10-318647 A1 | 12/1998 |
| JP | 11-132613 A1 | 5/1999 |
| JP | 11-510060 A1 | 9/1999 |
| JP | 2006-220275 A1 | 8/2006 |
| JP | 2008-019650 A1 | 1/2008 |
| JP | 4492064 B2 | 6/2010 |
| JP | 2011-174528 A1 | 9/2011 |
| JP | 2013-024287 A1 | 2/2013 |
| JP | 2013-057384 A | 3/2013 |
| JP | 2013-231457 A | 11/2013 |

OTHER PUBLICATIONS

European Search Report, European Application No. 14799093.1, dated Apr. 5, 2016 (5 pages).
International Preliminary Report on Patentability (PCT/JP2014/068475) dated Jul. 7, 2016.

* cited by examiner

COOLED-HYDROGEN SUPPLY STATION AND HYDROGEN COOLING APPARATUS

TECHNICAL FIELD

The present invention relates to a cooled-hydrogen supply station configured to supply cooled hydrogen to a fuel-cell vehicle or the like, and a hydrogen cooling apparatus used in the cooled-hydrogen supply station.

BACKGROUND ART

Since fuel-cell vehicles driven by hydrogen as a fuel do not emit an exhaust gas, those vehicles are environmentally friendly. Thus, in order that such fuel-cell vehicles are widely used, various developments are advanced in recent years. In order for prevalence of fuel-cell vehicles, a development of a vehicle itself is important, and a development of a hydrogen supply station for supplying hydrogen to a fuel-cell vehicle is also important.

Various techniques have been conventionally proposed for a hydrogen supply station (see, for example, JP4492064B).

DISCLOSURE OF THE INVENTION

In a hydrogen supply station, a fuel-cell vehicle is supplied with hydrogen. In this case, hydrogen is preferably supplied continuously to fuel-cell vehicles as many as possible. A method of cooling compressed hydrogen and supplying it to a fuel-cell vehicle is known as one of methods for achieving this object.

In such a method, it is desired that hydrogen can be cooled to a desired temperature with high efficiency, i.e., hydrogen can be cooled in an energy-saving manner. Further, it is preferable that the highly efficient cooling of hydrogen is realized with high precision, in order to supply hydrogen in a stable manner.

However, at the time of filing the present invention, there exists no cooled-hydrogen supply station that is capable of cooling hydrogen with sufficiently high efficiency and, preferably, with high precision.

The present invention has been made in view of the above circumstances. The object of the present invention is to provide a cooled-hydrogen supply station that is capable of cooling hydrogen with sufficiently high efficiency and, preferably, with high precision, and a hydrogen cooling apparatus used in the cooled-hydrogen supply station.

The present invention is a cooled-hydrogen supply station comprising: a first coolant passage through which a first coolant circulates; a water-cooled refrigerator unit disposed on a part of the first coolant passage to enable cooling of the first coolant; a second coolant passage through which a second coolant flows; a first heat exchanger enabling cooling of the second coolant by the first coolant, between another part of the first coolant passage and a part of the second coolant passage; a hydrogen storage unit in which hydrogen is stored; a hydrogen passage through which the hydrogen stored in the hydrogen storage unit is transported; and a second heat exchanger enabling cooling of the hydrogen by the second coolant, between another part of the second coolant passage and a part of the hydrogen passage; wherein: the hydrogen is cooled down to a temperature range of between −43° C. and −20° C. by the second heat exchanger; and a hydrogen cooling power for cooling hydrogen to −40° C. is between 13.5 kW and 16.5 kW.

According to the cooled-hydrogen supply station developed by the present inventors, since the hydrogen cooling power for cooling hydrogen down to −40° C. is between 13.5 kW and 16.5 kW (between 13.5 kW@−40° C. and 16.5 kW@−40° C.), hydrogen can be cooled with high efficiency, i.e., hydrogen can be cooled in a significantly energy-saving manner.

Preferably, the hydrogen may be cooled to a temperature within an error span between +2° C. and −3° C. with respect to a set temperature within the temperature range of between −43° C. and −20° C. by the second heat exchanger.

Namely, according to the cooled-hydrogen supply station developed by the present inventors, since the cooling precision within an error span between +2° C. and −3° C. with respect to a set temperature within the temperature range of between −43° C. and −20° C. can be achieved, hydrogen can be cooled with sufficiently high efficiency and with high precision.

To be specific, for example, the cooled-hydrogen supply station further comprises: a valve configured to control a rate of the first coolant circulating in the first coolant passage; a temperature sensor configured to detect a temperature of the second coolant in the second coolant passage; and a temperature feedback control unit configured to control the valve based on a detection result of the temperature sensor. In this case, the second coolant can be controlled at a desired temperature with high precision, by a simple temperature feedback control.

In addition, in the cooled-hydrogen supply station, it is preferable that the hydrogen passage has an outlet port from which the hydrogen having been cooled by the second heat exchanger is discharged, and that a flow rate of the hydrogen discharged from the outlet port is between 4.5 kg/3 minutes and 5.5 kg/3 minutes.

Due to the above supply rate of hydrogen, supply of hydrogen to at least one fuel-cell vehicle can be completed within 3 minutes (a hydrogen capacity of a current general fuel-cell vehicle is 5 kg). In addition, according to the cooled-hydrogen supply station developed by the present inventors, when hydrogen has been supplied to a certain fuel-cell vehicle at a flow rate between 4.5 kg/3 minutes and 5.5 kg/3 minutes, another succeeding fuel-cell vehicle can be supplied with hydrogen, after an interval of 7 minutes, at a flow rate between 4.5 kg/3 minutes and 5.5 kg/3 minutes.

The present inventors have confirmed that, in the cooled-hydrogen supply station, when the first coolant is flon and the second coolant is potassium formate solution, specifically, cold brine manufactured by Showa Corporation, the aforementioned respective performances can be realized.

In addition, in the cooled-hydrogen supply station, it is preferable that the cooled-hydrogen supply station is operated by selecting any of a first operation mode and a second operation mode, that the hydrogen is cooled to −20° C. in the first operation mode, and that the hydrogen is cooled to −40° C. in the second operation mode.

For example, when there is a high probability that the hydrogen has to be supplied, the first operation mode corresponding to an idling operation condition is selected. On the other hand, when there is a less probability that the hydrogen has to be supplied, the second operation mode corresponding to a standby condition is selected. Thus, consumption of energy for cooling the hydrogen can be efficiently restrained.

For example, the selection of the first operation mode and the second operation mode may be automatically carried out depending on a time zone. In this case, for example, in a nighttime zone where there is a less probability that the hydrogen has to be supplied (e.g., outside business hours), the first operation mode is selected, while in a daytime zone where there is a high probability that the hydrogen has to be supplied (e.g., during business hours), the second operation mode is selected. Thus, in the nighttime zone where there is a less probability that the hydrogen has to be supplied, consumption of energy for cooling the hydrogen can be efficiently restrained.

In addition, in the cooled-hydrogen supply station, the second coolant passage may be composed of a first half passage, a second half passage, and a tank unit connecting the first half passage and the second half passage. The first half passage includes the part of the second coolant passage where heat is exchanged between the part of the second coolant passage and the other part of the first coolant passage by the first heat exchanger. The second half passage includes the other part of the second coolant passage where heat is exchanged between the other part of the second coolant passage and the part of the hydrogen passage by the second heat exchanger. A coolant-amount regulating mechanism for regulating a liquid level of the second coolant in the tank unit within a predetermined range may be connected to the tank unit.

In this case, even when a liquefied coolant that is highly corrosive is used as the second coolant and the second coolant expands or contracts because of change in temperature, since the liquid level of the second coolant in the tank unit can be maintained within a predetermined range, it is possible to prevent generation of corrosion of an inner wall of the tank unit and adhesion of deposit thereon, which might be caused by the rise or lowering of the liquid level of the second coolant.

Further, in this case, it is preferable [claim 1]. The present inventors have confirmed that, when the flow rate of the second coolant flowing through the second half passage of the second coolant passage is between 135 L/min and 165 L/min at a flow pressure of 0.3 Mpa, hydrogen can be cooled with sufficiently high efficiency.

In addition, the present invention is a hydrogen cooling apparatus configured to cool hydrogen transported in a hydrogen passage; the hydrogen cooling apparatus comprising: a first coolant passage through which a first coolant circulates; a water-cooled refrigerator unit disposed on a part of the first coolant passage to enable cooling of the first coolant; a second coolant passage through which a second coolant flows; a first heat exchanger enabling cooling of the second coolant by the first coolant, between another part of the first coolant passage and a part of the second coolant passage; a second heat exchanger enabling cooling of the hydrogen by the second coolant, between another part of the second coolant passage and a part of the hydrogen passage; wherein: the hydrogen is cooled to a temperature within an error span between +2° C. and −3° C. with respect to a set temperature within the temperature range of between −43° C. and −20° C. by the second heat exchanger; and a hydrogen cooling power for cooling hydrogen to −40° C. is between 13.5 kW and 16.5 kW.

MODE FOR CARRYING OUT THE INVENTION

Figure 1:
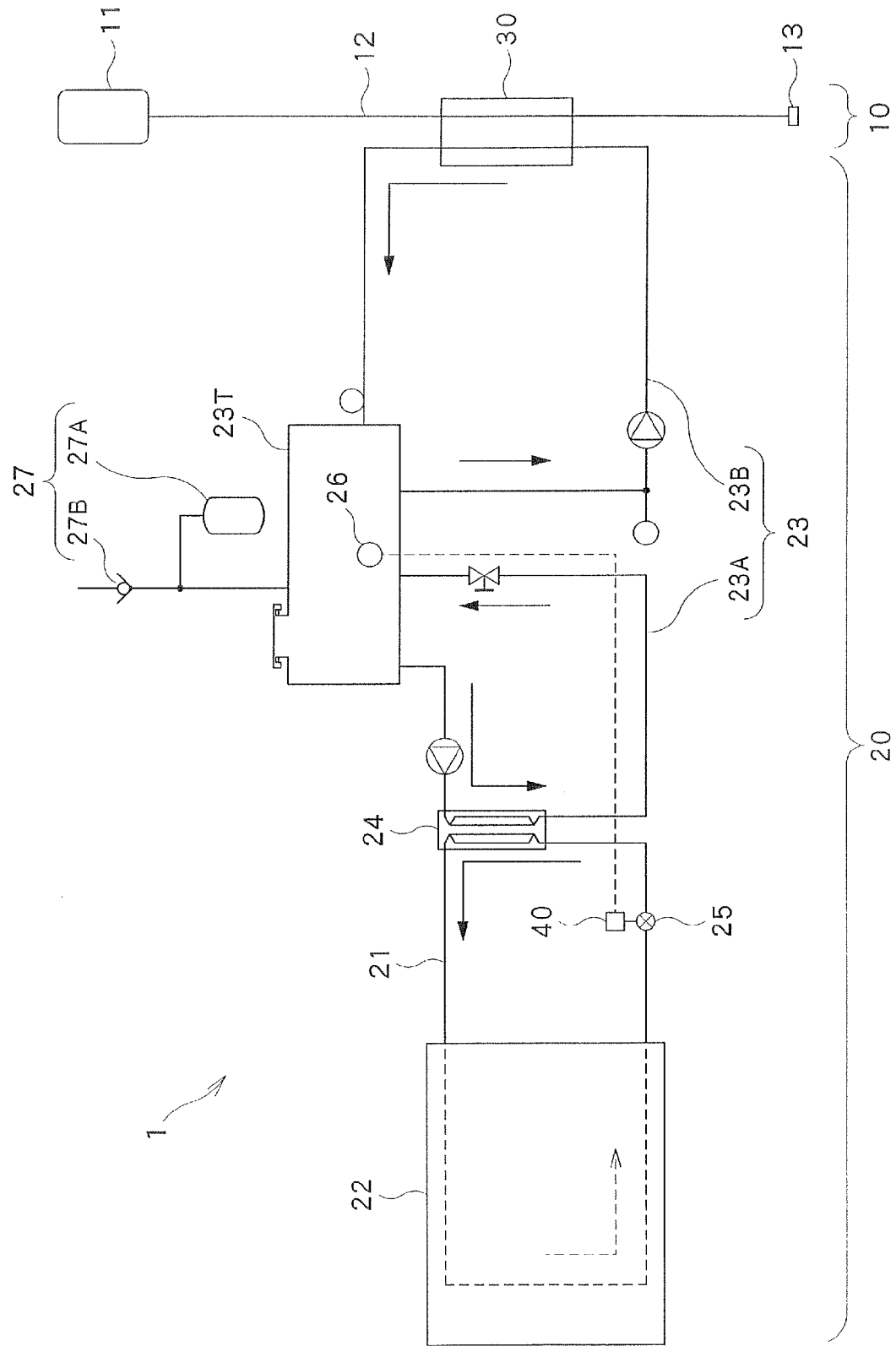
FIG. 1 is a system view of a cooled-hydrogen supply station according to one embodiment of the present invention.
Figure 2:
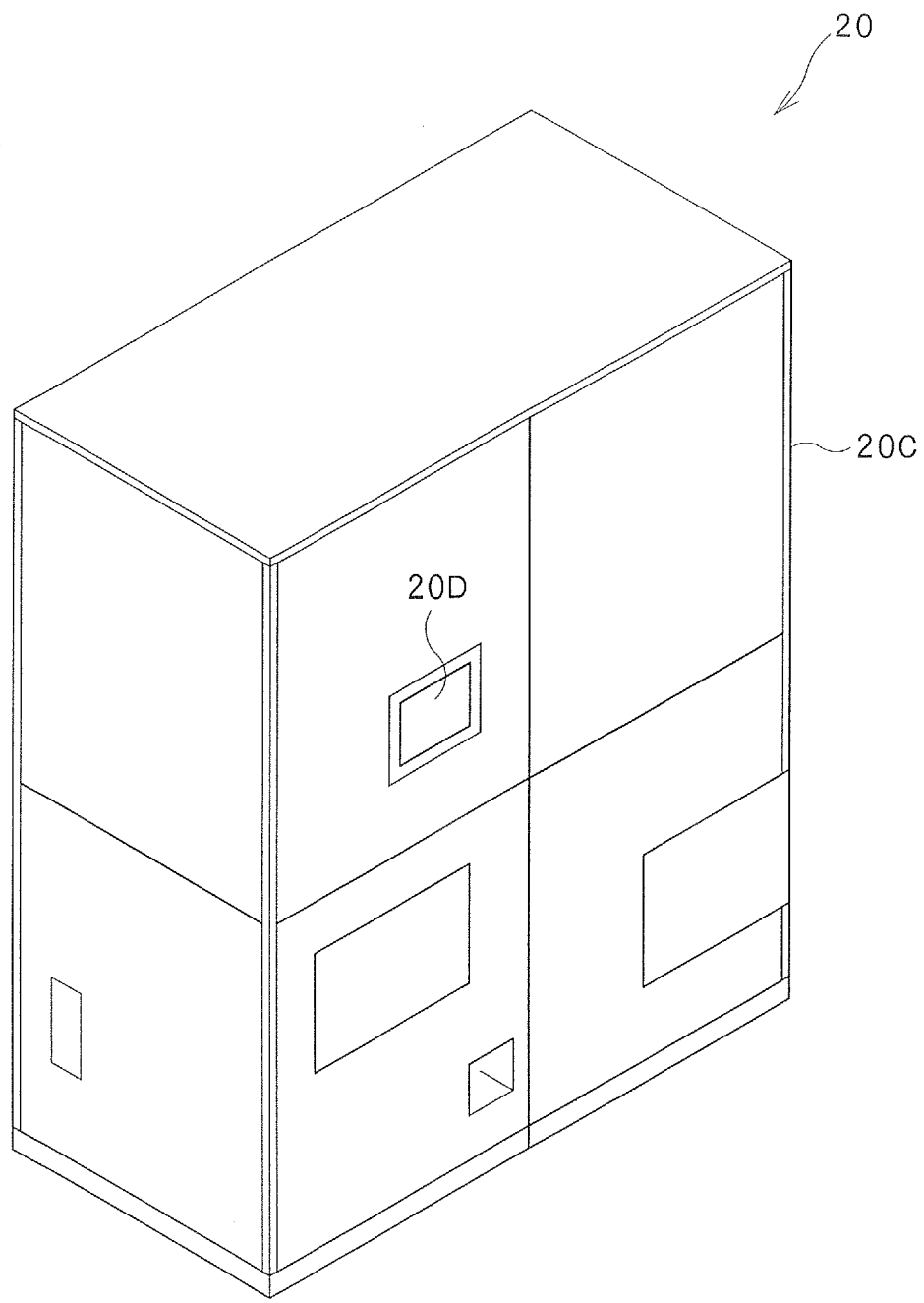
FIG. 2 is a schematic perspective view of a hydrogen cooling apparatus in the cooled-hydrogen supply station according to the one embodiment of the present invention.

An embodiment of the present invention will be described herebelow with reference to the attached drawings. FIG. 1 is a system view of a cooled-hydrogen supply station 1 according to one embodiment of the present invention, and FIG. 2 is a schematic perspective view of a hydrogen cooling apparatus 2 in the cooled-hydrogen supply station 1.

As shown in FIG. 1, the cooled-hydrogen supply station 1 includes a hydrogen storage unit 11 in which hydrogen is stored, and a hydrogen passage 12 through which the hydrogen stored in the hydrogen storage unit 11 is transported. A downstream end of the hydrogen passage 12 defines an outlet port 13. The hydrogen is supplied from the outlet port 13 to a fuel supply port of a fuel-cell vehicle. When the hydrogen is supplied, the outlet port 13 and the fuel supply port of a fuel-cell vehicle are air-tightly connected to each other.

Compressed hydrogen is stored in the hydrogen storage unit 11 in this embodiment. Thus, the compressed hydrogen is supplied into the hydrogen passage 12. In this embodiment, hydrogen is compressed in such a manner that a rate of hydrogen to be discharged from the outlet port 13 (a rate of hydrogen to be supplied to a fuel-cell vehicle) is between 4.5 kg/3 minutes and 5.5 kg/3 minutes, in particular, 5.0 kg/3 min.

In addition, as shown in FIG. 1, the cooled-hydrogen supply station 1 includes: a first coolant passage 21 through which a first coolant circulates; a water-cooled refrigerator unit 22 disposed on a part of the first coolant passage 21 to enable cooling of the first coolant; a second coolant passage 23 through which a second coolant flows; and a first heat exchanger 24 enabling cooling of the second coolant by the first coolant, between another part of the first coolant passage 21 (a part different from the part that is cooled by the water-cooled refrigerator unit 22) and a part of the second coolant passage 23.

A circulation direction of the first coolant in the first coolant passage 21 is indicated by the arrows in FIG. 1. Namely, the first coolant is cooled by the water-cooled refrigerator unit 22, the first coolant then passes through the first heat exchanger 24, and the first coolant returns again to the water-cooled refrigerator unit 22. In order to circulate the first coolant in this direction, there is provided a motor valve 25 at a part of the first coolant passage 21 extending from the water-cooled refrigerator unit 22 to the first heat exchanger 24. The motor valve 25 is equipped with a driving motor (not shown) for circulating the first coolant, and a flowrate regulating valve (not shown) for regulating a flow rate of the circulating first coolant.

In addition, a second heat exchanger 30 enabling cooling of the hydrogen by the second coolant is disposed between another part of the second coolant passage 23 (a part different from the part that is cooled by the first heat exchanger 24) and a part of the hydrogen passage 12. The second heat exchange 30 is configured to cool the hydrogen in the hydrogen passage 12, before the hydrogen reaches the outlet opening 13.

In this embodiment, the second coolant passage 23 is composed of a first half passage 23A, a second half passage 23B, and a tank unit 23T connecting the first half passage 23A and the second half passage 23B. The first half passage 23A includes the part of the second coolant passage 23 where heat is exchanged between the part of the second coolant passage 23 and the other part of the first coolant passage 21 by the first heat exchanger 24. The second half passage 23B includes the other part of the second coolant passage 23 where heat is exchanged between the other part of the second coolant passage 23 and the part of the hydrogen passage 12 by the second heat exchanger 30.

The tank unit 23T is substantially fully filled with the second coolant. Due to pumps (not shown) provided on each of the first half passage 23A and the second half passage 23B, as shown in the arrows in FIG. 1, the second coolant, which has been supplied from the tank unit 23T to the first half passage 23A, flows through the first heat exchanger 24 so as to be cooled by the first coolant, and then returns to the tank unit 23T, while the second coolant, which has been supplied from the tank unit 23T to the second half passage 23B, flows through the second heat exchanger 30 to cool the hydrogen (so that the second coolant is heated), and then returns to the tank unit 23T. In this embodiment, the respective pumps (not shown) are controlled such that a flow rate of the second coolant flowing through the second half passage 23B is between 135 L/min@0.3 Mpa and 165 L/min@0.3 Mpa (i.e., between 135 L/min and 165 L/min at a flow pressure of 0.3 Mpa), in particular, 150 L/min@0.3 Mpa (i.e., 150 L/min at a flow pressure of 0.3 Mpa). To be specific, the respective pumps (not shown) are feedback-controlled based on flow rate values (detection result) detected by flow rate sensors (not shown) that are suitably disposed.

In addition, a temperature sensor 26 configured to detect a temperature of the second coolant is provided in the tank unit 23T. A temperature value (detection result) detected by the temperature sensor 26 is outputted to a temperature feedback control unit 40 that is configured to control the motor valve 25 of the first coolant passage 21, based on a predetermined control program. Namely, based on the detection result of the temperature sensor 26, the temperature feedback control unit 40 is configured to control the motor valve 25 of the first coolant passage 21, based on the predetermined control program.

Thus, a cooling power of the first coolant in the first heat exchanger 24 is regulated, whereby a temperature of the second coolant flowing through the second heat exchanger 30 can be regulated to a desired temperature.

As described above, since the temperature of the second coolant flowing through the second heat exchanger 30 is regulated, the hydrogen in the hydrogen passage 12 can be regulated to a set temperature, which is set within a temperature range of between −43° C. and −20° C., through the second heat exchanger 30.

In this embodiment, flon is used as the first coolant circulating in the first coolant passage 21. Specifically, there is used HFC-based mixture coolant R404A manufactured by Du Pont-Mitsui Fluorochemicals Co., Ltd. Meanwhile, cold brine FP-40 (potassium formate solution) manufactured by Showa Corporation is used as the second coolant flowing in the second coolant passage 23.

The cold brine FP-40 serving as the second coolant is a liquefied coolant, and is capable of holding flowability within a temperature range of between −43° C. and −20° C. Further, the cold brine FP-40 serving as the second coolant may expand or contract depending on a temperature thereof. In this case, when such a second coolant expands or contracts, a liquid level of the second coolant in the tank unit 23T raises or lowers, which may cause corrosion thereof. However, in this embodiment, in order to prevent this situation, a coolant-amount regulating mechanism 27 configured to maintain a liquid level of the second coolant in the tank unit 23T within a predetermined range (preferably at a predetermined liquid level height) is connected to the tank unit 23T. The coolant-amount regulating mechanism 27 has a regulating tank 27A and a check valve 27B that are connected to the tank unit 23T. When the second coolant is cooled to contract, the coolant-amount regulating mechanism 27 is configured to replenish the second coolant from the regulating tank 27A into the tank unit 23T, so as to maintain the liquid level of the second coolant within the predetermined range. On the other hand, when the second coolant is heated to expand, the coolant-amount regulating mechanism 27 is configured to discharge the second coolant from the tank unit 23T through the check valve 27B so as to maintain the liquid level of the second coolant within the predetermined range.

In FIG. 1, the hydrogen storage unit 11 and the hydrogen passage 12 passing through the second heat exchanger 30 constitute a hydrogen supply dispenser 10 in the cooled-hydrogen supply station 1. On the other hand, a part of the cooled-hydrogen supply station 1, other than the hydrogen storage unit 11 and the hydrogen passage 12, can be understood as a hydrogen cooling apparatus 20. The cooled-hydrogen supply station 1 is formed by combining the hydrogen supply dispenser 10 and the hydrogen cooling apparatus 20 through the second heat exchanger 30.

In the aforementioned cooled-hydrogen supply station 1, the water-cooled refrigerator unit 22 and the plurality of coolant passages including the motor valve and the pumps are used. By suitably selecting coolants circulating through these coolant passages, the cooled-hydrogen supply station 1 can have a hydrogen cooling power of 13.5 kW to 16.5 kW for cooling hydrogen down to −40° C. (13.5 kW@−40° C. to 16.5 kW@−40° C.). Namely, the cooled-hydrogen supply station 1 can maintain the hydrogen at −40° C. at a power between 13.5 kW and 16.5 kW. Further, a cooling precision within an error span between +2° C. and −3° C. with respect to a set temperature within the temperature range of between −43° C. and −20° C. can be achieved.

In addition, the cooled-hydrogen supply station 1 according to this embodiment can be operated by selecting any of a first operation mode and a second operation mode. In the first operation mode, the hydrogen is cooled to −20° C. Meanwhile, in the second operation mode, the hydrogen is cooled to −40° C. The selection of the first operation mode or the second operation mode is automatically carried out depending on a time zone. For example, in this embodiment, the first operation mode is selected from 5:00 pm to 9:00 am, and the second operation mode is selected in a time zone other than between 5:00 pm to 9:00 am.

Moreover, in this embodiment, setting of a time zone in which the first operation mode is selected and a time zone in which the second operation mode is selected can be manually changed. To be specific, as shown in FIG. 2, a housing 20C of the hydrogen cooling apparatus 20 is provided with a touch panel 20D, whereby an operator can manually operate the hydrogen cooling apparatus 20 through the touch panel 20D.

Further, the selection itself of the first operation mode or the second operation mode may be manually carried out through the touch panel 20D. Alternatively, the selection of the first operation mode or the second operation mode may be automatically carried out depending on an outside air temperature.

Next, an operation of the hydrogen supply station 1 according to this embodiment is explained.

The hydrogen supply station 1 according to this embodiment is operated by selecting the first operation mode in which the hydrogen is cooled to −20° C. or the second operation mode in which the hydrogen is cooled to −40° C.

An operation of the hydrogen supply station 1 in the first operation mode is explained firstly. Upon start of the operation in the first operation mode, the motor valve 25 of the first coolant passage 21 is driven so that circulation of the first coolant in the first coolant passage 21 is started in the direction of the arrows in FIG. 1. In addition, the pump on the first half passage 23A of the second coolant passage 23 is driven so that circulation of the second coolant in the first half passage 23A is started in the direction of the arrows in FIG. 1. Thus, the first coolant circulating in the first coolant passage 21 passes through the first heat exchanger 24, and the second coolant circulating in the first half passage 23A passes through the first heat exchanger 24. At this time, the second coolant is cooled by the first coolant through the first heat exchanger 24.

The temperature of the second coolant, which has passed through the first heat exchanger 24 to return into the tank unit 23T, is detected by the temperature sensor 26 in the tank unit 23T. The feedback control unit 40 controls the motor valve 25 of the first coolant passage 21, depending on a difference between the temperature of the second coolant, which has been detected by the temperature sensor 26, and −20° C. The motor valve 25 controls the flow rate of the first coolant circulating in the first coolant passage 21 such that the second coolant in the tank unit 23T has a temperature of −20° C. Thus, the temperature of the second coolant in the tank unit 23T is controlled at −20° C.

When the second coolant in the tank unit 23T has a temperature of −20° C., the pump on the second half passage 23B of the second coolant passage 23 is driven, so that circulation of the second coolant in the second half passage 23B is started. Thus, the second coolant cooled at −20° C. passes through the second heat exchanger 30. At this time, the hydrogen in the hydrogen passage 12 is cooled down to −20° C. by the second coolant through the second heat exchanger 30.

Then, the second coolant, which has passed through the second heat exchanger 30 so as to have a higher temperature, returns to the tank unit 23T. Thus, the temperature of the second coolant in the tank unit 23T may vary from −20° C. However, since the temperature of the second coolant is detected by the temperature sensor 26, and the motor valve 25 is controlled by the temperature feedback control unit 40 based on the detected temperature. Thus, the temperature of the second coolant circulating in the second half passage 23B can be stably maintained at −20° C.

Next, an operation of the hydrogen supply station 1 in the second operation mode is explained. Upon start of the operation in the second operation mode, the motor valve 25 of the first coolant passage 21 is driven so that circulation of the first coolant in the first coolant passage 21 is started in the direction of the arrows in FIG. 1. In addition, the pump on the first half passage 23A of the second coolant passage 23 is driven so that circulation of the second coolant in the first half passage 23A is started in the direction of the arrows in FIG. 1. Thus, the first coolant circulating in the first coolant passage 21 passes through the first heat exchanger 24, and the second coolant circulating in the first half passage 23A passes through the first heat exchanger 24. At this time, the second coolant is cooled by the first coolant through the first heat exchanger 24.

The temperature of the second coolant, which has passed through the first heat exchanger 24 to return into the tank unit 23T, is detected by the temperature sensor 26 in the tank unit 23T. The feedback control unit 40 controls the motor valve 25 of the first coolant passage 21, depending on a difference between the temperature of the second coolant, which has been detected by the temperature sensor 26, and −40° C. The motor valve 25 controls the flow rate of the first coolant circulating in the first coolant passage 21 such that the second coolant in the tank unit 23T has a temperature of −40° C. Thus, the temperature of the second coolant in the tank unit 23T is controlled at −40° C.

When the second coolant in the tank unit 23T has a temperature of −40° C., the pump on the second half passage 23 on the second half passage 23B of the second coolant passage 23 is driven, so that circulation of the second coolant in the second half passage 23B is started. Thus, the second coolant cooled at −40° C. passes through the second heat exchanger 30. At this time, the hydrogen in the hydrogen passage 12 is cooled down to −40° C. by the second coolant through the second heat exchanger 30. At this time, the flow rate of the circulating second coolant is between 135 L/min@0.3 Mpa and 165 L/min@0.3 Mpa, in particular, 150 L/min@0.3 Mpa.

Then, the second coolant, which has passed through the second heat exchanger 30 so as to have a higher temperature, returns to the tank unit 23T. Thus, the temperature of the second coolant in the tank unit 23T may vary from −40° C. However, since the temperature of the second coolant is detected by the temperature sensor 26, and the motor valve 25 is controlled by the temperature feedback control unit 40 based on the detected temperature. Thus, the temperature of the second coolant circulating in the second half passage 23B can be stably maintained at −40° C.

Actually, according to the cooled-hydrogen supply station 1 developed by the present inventors, the second coolant can be cooled with high precision to a temperature within an error span between +2° C. and −3° C. Thus, the hydrogen cooled by the second coolant can be cooled with high precision to a temperature within an error span between +2° C. and −3° C.

According to the second operation mode in this embodiment, it takes 120 minutes for the second coolant to be cooled from, e.g., an external temperature of +40° C. to −40° C. In addition, it takes only 30 minutes for the second coolant cooled at −20° C. in the first operation mode to be further cooled to −40° C.

The cooled-hydrogen supply station 1 in this embodiment can supply the hydrogen, which is cooled with high precision as described above, to a fuel-cell vehicle at a flow rate between 4.5 kg/3 minutes and 5.5 kg/3 minutes, in particular, 5.0 kg/min. In addition, according to the cooled-hydrogen supply station 1, when the hydrogen has been supplied to a certain fuel-cell vehicle at a flow rate between 4.5 kg/3 minutes and 5.5 kg/3 minutes, in particular, 5.0 kg/min, another succeeding fuel-cell vehicle can be supplied with hydrogen, after an interval of 7 minutes, at a flow rate between 4.5 kg/3 minutes and 5.5 kg/3 minutes, in particular, 5.0 kg/min.

A cooling power for stably maintaining at −40° C. the second coolant that has been cooled to −40° C. is between 13.5 kW@−40° C. and 16.5 kW@−40° C., in particular, 15.0 kW@−40° C.

When the first operation mode is switched to the second operation mode, the motor valve 25 on the first coolant passage 21 and the pump on the first half passage 23A may be driven continuously from the first operation mode. Similarly, when the second operation mode is switched to the first operation mode, the motor valve 25 on the first coolant passage 21 and the pump on the first half passage 23A may be driven continuously from the second operation mode.

In addition, in both of the first operation mode and the second operation mode, the cold brine FP-40 serving as the second coolant may expand or contract depending on a temperature thereof. In this embodiment, even when the second coolant expands or contracts, the coolant-amount regulating mechanism 27 functions such that the liquid level of the second coolant in the tank unit 23T is maintained within a predetermined range (preferably at a predetermined liquid level height), in order to prevent that the liquid level of the second coolant in the tank unit 23T raises or lowers to cause corrosion or the like. When the second coolant is cooled to contract, the coolant-amount regulating mechanism 27 replenishes the second coolant from the regulating tank 27A into the tank unit 23T, so as to maintain the liquid level of the second coolant within the predetermined range. On the other hand, when the second coolant is heated to expand, the coolant-amount regulating mechanism 27 discharges the second coolant from the tank unit 23T to the outside through the check valve 27B, so as to maintain the liquid level of the second coolant within the predetermined range.

According to the cooled-hydrogen supply station 1 in this embodiment, since the hydrogen cooling power of between 13.5 kW@−40° C. and 16.5 kW@−40° C. can be achieved, the hydrogen can be cooled with high efficiency, i.e., the hydrogen can be cooled in a significantly energy-saving manner.

Further, in this embodiment, since the cooling precision within an error span between +2° C. and −3° C. with respect to a set temperature within the temperature range of between −43° C. and −20° C. can be achieved, the hydrogen can be cooled with sufficiently high efficiency and with high precision.

In addition, according to the cooled-hydrogen supply station 1 in this embodiment, the cooled-hydrogen supply station 1 is operated by selecting any of the first operation mode and the second operation mode. In the first operation mode, the hydrogen is cooled to −20° C. Meanwhile, in the second operation mode, the hydrogen is cooled to −40° C. Thus, when there is a high probability that the hydrogen has to be supplied, the first operation mode corresponding to an idling operation condition is selected. On the other hand, when there is a less probability that the hydrogen has to be supplied, the second operation mode corresponding to a standby condition is selected. Thus, consumption of energy for cooling the hydrogen can be efficiently restrained.

To be specific, in this embodiment, the selection of the first operation mode or the second operation mode is automatically carried out depending on a time zone. In a nighttime zone where there is a less probability that the hydrogen has to be supplied (e.g., outside business hours), the first operation mode is selected, while in a daytime zone where there is a high probability that the hydrogen has to be supplied (e.g., during business hours), the second operation mode is selected. Thus, in the nighttime zone where there is a less probability that the hydrogen has to be supplied, consumption of energy for cooling the hydrogen can be efficiently restrained.

1 Cooled-hydrogen supply station
10 Hydrogen supply apparatus
11 Hydrogen storage unit
12 Hydrogen passage
13 Outlet port
20 Hydrogen cooling apparatus
21 First coolant passage
22 Water-cooled refrigerator unit
23 Second coolant passage
23A First half passage
23B Second half passage
23T Tank unit
24 First heat exchanger
25 Motor valve
26 Temperature sensor
27 Coolant-amount regulating tank
30 Second heat exchanger
40 Temperature feedback control unit

The invention claimed is:

1. A cooled-hydrogen supply station comprising:
a first coolant passage through which a first coolant circulates;
a water-cooled refrigerator unit disposed on a part of the first coolant passage to enable cooling of the first coolant;
a second coolant passage through which a second coolant flows;
a first heat exchanger enabling cooling of the second coolant by the first coolant, between another part of the first coolant passage and a part of the second coolant passage;
a hydrogen storage unit in which hydrogen is stored;
a hydrogen passage through which the hydrogen stored in the hydrogen storage unit is transported; and
a second heat exchanger enabling cooling of the hydrogen by the second coolant, between another part of the second coolant passage and a part of the hydrogen passage;
wherein:
the first coolant is flon;
the second coolant is potassium formate solution;
the second coolant passage is composed of a first half passage including the part of the second coolant passage where heat is exchanged between the part of the second coolant passage and the other part of the first coolant passage by the first heat exchanger, and a second half passage including the other part of the second coolant passage where heat is exchanged between the other part of the second coolant passage and the part of the hydrogen passage by the second heat exchanger;
a flow rate of the second coolant flowing through the second half passage of the second coolant passage is between 135 L/min and 165 L/min at a flow pressure of 0.3 Mpa;
the hydrogen is cooled down to a temperature range of between −43° C. and −20° C. by the second heat exchanger;
the hydrogen is cooled to a temperature within an error span between ±2° C. and −3° C. with respect to a set temperature within the temperature range of between −43° C. and −20° C. by the second heat exchanger;
a hydrogen cooling power for cooling hydrogen to −40° C. is between 13.5 kW and 16.5 kW;
the hydrogen passage has an outlet port from which the hydrogen having been cooled by the second heat exchanger is discharged; and
a flow rate of the hydrogen discharged from the outlet port is between 4.5 kg/3 minutes and 5.5 kg/3 minutes.

2. The cooled-hydrogen supply station according to claim 1, further comprising:
a valve configured to control a rate of the first coolant circulating in the first coolant passage;
a temperature sensor configured to detect a temperature of the second coolant in the second coolant passage; and
a temperature feedback control unit configured to control the valve based on a detection result of the temperature sensor.

3. The cooled-hydrogen supply station according to claim 1, wherein:
the cooled-hydrogen supply station is operated by selecting any of a first operation mode and a second operation mode;
the hydrogen is cooled to −20° C. in the first operation mode; and
the hydrogen is cooled to −40° C. in the second operation mode.

4. The cooled-hydrogen supply station according to claim 3, wherein
the selection of the first operation mode or the second operation mode is automatically carried out depending on a time zone.

5. The cooled-hydrogen supply station according to claim 1, wherein:
the second coolant passage further includes a tank unit connecting the first half passage and the second half passage; and
a coolant-amount regulating mechanism configured to maintain a liquid level of the second coolant in the tank unit within a predetermined range is connected to the tank unit.

6. A hydrogen cooling apparatus configured to cool hydrogen transported in a hydrogen passage; the hydrogen cooling apparatus comprising:
a first coolant passage through which a first coolant circulates;
a water-cooled refrigerator unit disposed on a part of the first coolant passage to enable cooling of the first coolant;
a second coolant passage through which a second coolant flows;
a first heat exchanger enabling cooling of the second coolant by the first coolant, between another part of the first coolant passage and a part of the second coolant passage;
a second heat exchanger enabling cooling of the hydrogen by the second coolant, between another part of the second coolant passage and a part of the hydrogen passage;
wherein:
the first coolant is flon;
the second coolant is potassium formate solution;
the second coolant passage is composed of a first half passage including the part of the second coolant passage where heat is exchanged between the part of the second coolant passage and the other part of the first coolant passage by the first heat exchanger, and a second half passage including the other part of the second coolant passage where heat is exchanged between the other part of the second coolant passage and the part of the hydrogen passage by the second heat exchanger;
a flow rate of the second coolant flowing through the second half passage of the second coolant passage is between 135 L/min and 165 L/min at a flow pressure of 0.3 Mpa;
the hydrogen is cooled down to a temperature range of between −43° C. and −20° C. by the second heat exchanger;
the hydrogen is cooled to a temperature within an error span between +2° C. and −3° C. with respect to a set temperature within the temperature range of between −43° C. and −20° C. by the second heat exchanger;
a hydrogen cooling power for cooling hydrogen to −40° C. is between 13.5 kW and 16.5 kW;
the hydrogen passage has an outlet port from which the hydrogen having been cooled by the second heat exchanger is discharged; and
a flow rate of the hydrogen discharged from the outlet port is between 4.5 kg/3 minutes and 5.5 kg/3 minutes.

* * * * *